United States Patent [19]

Martin

[11] Patent Number: 4,577,255
[45] Date of Patent: Mar. 18, 1986

[54] LIGHTNING PROTECTION CIRCUIT FOR DIGITAL SUBSCRIBER LOOP INTERFACE

[75] Inventor: Philip T. Martin, Raleigh, N.C.

[73] Assignee: ITT Corporation, New York, N.Y.

[21] Appl. No.: 622,432

[22] Filed: Jun. 20, 1984

[51] Int. Cl.⁴ .............................................. H02H 9/04
[52] U.S. Cl. .............................. 361/119; 179/170 D; 179/2 C; 361/56; 361/91
[58] Field of Search ............ 361/35, 56, 91, 110–113, 361/117, 118, 119, 107; 179/2 C, 2 DP, 170 D; 333/25, 26, 117–119; 307/89–91; 375/5, 8

[56] References Cited

U.S. PATENT DOCUMENTS

| | | | |
|---|---|---|---|
| 1,573,068 | 2/1926 | Honaman | 361/118 X |
| 1,979,101 | 10/1934 | Dudley | 361/118 X |
| 3,181,033 | 4/1965 | Bakker | 361/91 X |
| 4,232,293 | 11/1980 | Harris | 179/2 C X |
| 4,289,939 | 9/1981 | Arnold | 179/170 D |
| 4,378,472 | 3/1983 | Lechner | 179/170 D |
| 4,471,489 | 9/1984 | Konetski et al. | 179/2 DP X |

*Primary Examiner*—Harry E. Moose, Jr.
*Attorney, Agent, or Firm*—John T. O'Halloran; Thomas F. Meagher

[57] ABSTRACT

A lightning protection circuit for a digital subscriber loop interface has a loop interface transformer primary, connected across the TIP and RING terminals of the DSL interface, with a split winding. The split primary windings are balanced to minimize induced secondary voltages in the event of common mode lightning signals. Matched TIP and RING resistors limit the lightning current flowing to lightning ground. Back-to-back zener diode pairs across each split winding, and a capacitor connecting the split windings, limit the voltage across the windings in the event of differential lightning signals. The capacitor absorbs most of the lightning energy, rather than the secondary windings or the resistors.

Back-to-back zener diode pairs across each secondary winding provide further lightning protection by limiting the energy absorbed by the transmit and receive circuitry. A resistor and diode configuration is used to protect the DSL interface analog switch and power supplies of the receive circuitry, and a diode may be used to protect the −5 volt power supply of the transmit circuitry.

14 Claims, 2 Drawing Figures

LIGHTNING PROTECTION CIRCUIT FOR DIGITAL SUBSCRIBER LOOP INTERFACE

BACKGROUND OF THE INVENTION

1. Field of the Invention

This invention is related to apparatus for providing lightning protection to a digital subscriber loop interface.

2. Description of the Prior Art

The digital subscriber loop (DSL) interface is difficult to protect against lightning because it is a low impedance circuit to match the low impedance of the DSL. The DSL impedance is about 100 ohms over the frequency band, 125 kHz to 250 kHz, used to transmit the digital signals. The 100 ohm impedance is low compared to the 600 to 900 ohm impedance of the line at voice frequencies. Thus, the two battery feed series resistors used to protect the semiconductor subscriber line interface circuit (SLIC), which are each selected to be one-half of the line impedance, can not be used with the DSL interface because they would increase the circuit impedance far above the nominal impedance. This in turn would cause high attenuation of the transmitted and received signals, and would also cause echos due to impedance mismatch. This invention is intended to overcome these problems and to protect the DSL interface.

SUMMARY OF THE INVENTION

Briefly, the present invention is a lightning protection circuit for a digital subscriber loop interface. The loop interface transformer primary, connected across the TIP and RING terminals of the DSL interface, has a split winding. The split primary windings are balanced to minimize induced secondary voltages in the event of common mode lightning signals. Matched TIP and RING resistors limit the lightning current flowing to lightning ground. Back-to-back zener diode pairs across each split winding, and a capacitor connecting the split windings, limit the voltage across the windings in the event of differential lightning signals. The capacitor absorbs most of the lightning energy, rather than the secondary windings or the resistors.

Back-to-back zener diode pairs across each secondary winding provide further lightning protection by limiting the energy absorbed by the transmit and receive circuitry. A resistor and diode configuration is used to protect the DSL interface analog switch and power supplies of the receive circuitry, and a diode may be used to protect the −5 volt power supply of the transmit circuitry.

DETAILED DESCRIPTION

Figure 1:
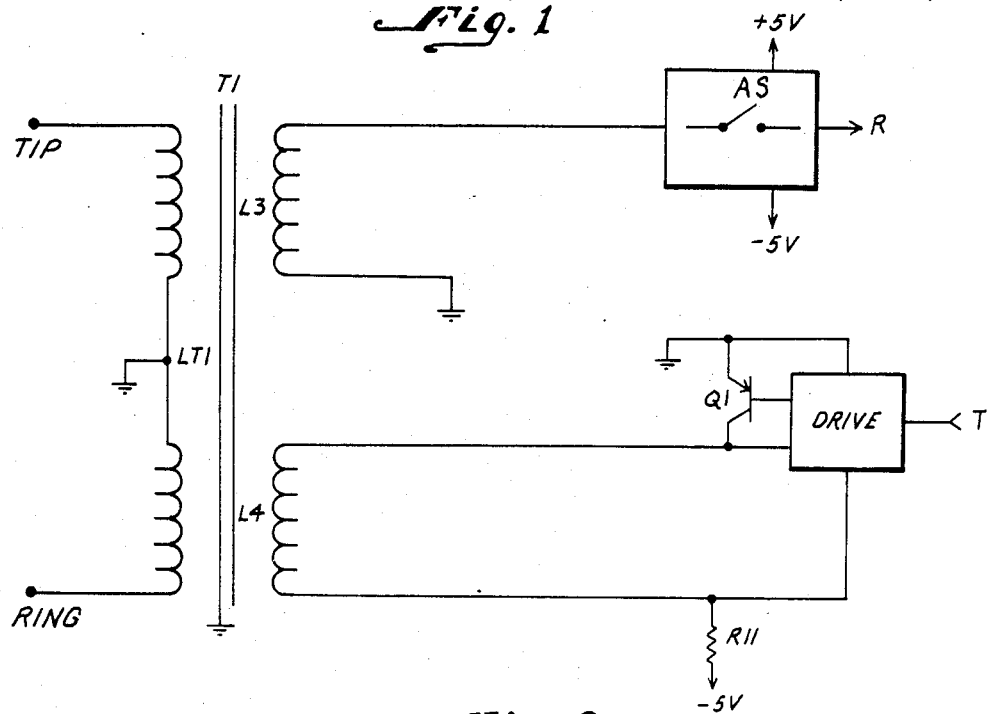
FIG. 1 is a schematic diagram of a prior art DSL interface of a Double Burst Time Separation unit.

FIG. 1 shows a prior art DSL interface of a Double Burst Time Separation (DBTS) unit. The interface with the subscriber transmission line is made at the TIP and RING terminals. A sequence of twenty bits is transmitted via the transmit secondary winding L4 of transformer T1. This sequence is transmitted in an AMI (Alternate Mark Inversion)-type code which prevents changes in the DC current in L4. The signal is coupled into the subscriber line by the center-tapped transformer primary winding LT1. The transmit secondary driving circuitry, comprising transistor Q1, Q1 driving circuitry DRIVE, and resistor R11, provides a low impedance to match the low subscriber transmission line impedance, which is about 100 ohms over the frequency band, 125 kHz to 250 kHz, used to transmit the digital signals. The twenty bit sequences, or bursts, are transmitted at 4.0 KHz rate and are applied to transmit terminal T. The bits in the burst are transmitted at a 256 Kbit per second rate, so that only a small fraction of the time between bursts is taken up. Thus, two ten bit words are transmitted in each burst providing words on average at a 8.0 KHz rate.

While the burst is being transmitted, the receive portion of the interface is turned off. Receive secondary winding L3 is connected to the analog switch AS at one terminal, and is grounded via its other terminal. The receive signal is supplied to receive terminal R via the analog switch. When the burst is transmitted, the analog switch is opened to avoid crosstalk from output to input.

Once the burst has been transmitted, the analog switch is closed and the receiver awaits the return burst from the complimentary unit at the other end of the subscriber line. After the return burst is received, the transmission cycle begins again.

The FIG. 1 circuit, however, is not protected against lightning. The line impedance of the DSL, about 100 ohms, is low compared to the 600 to 900 ohm impedance of the line at voice frequencies. Thus, the two battery feed series resistors used to protect the semiconductor line interface circuit (SLIC), which are each selected to be one-half of the line impedance, can not be used with the DSL interface because they would increase the circuit impedance far above the nominal impedance. This in turn would cause high attenuation of the transmitted and received signals, and would also cause echos due to impedance mismatch.

Figure 2:
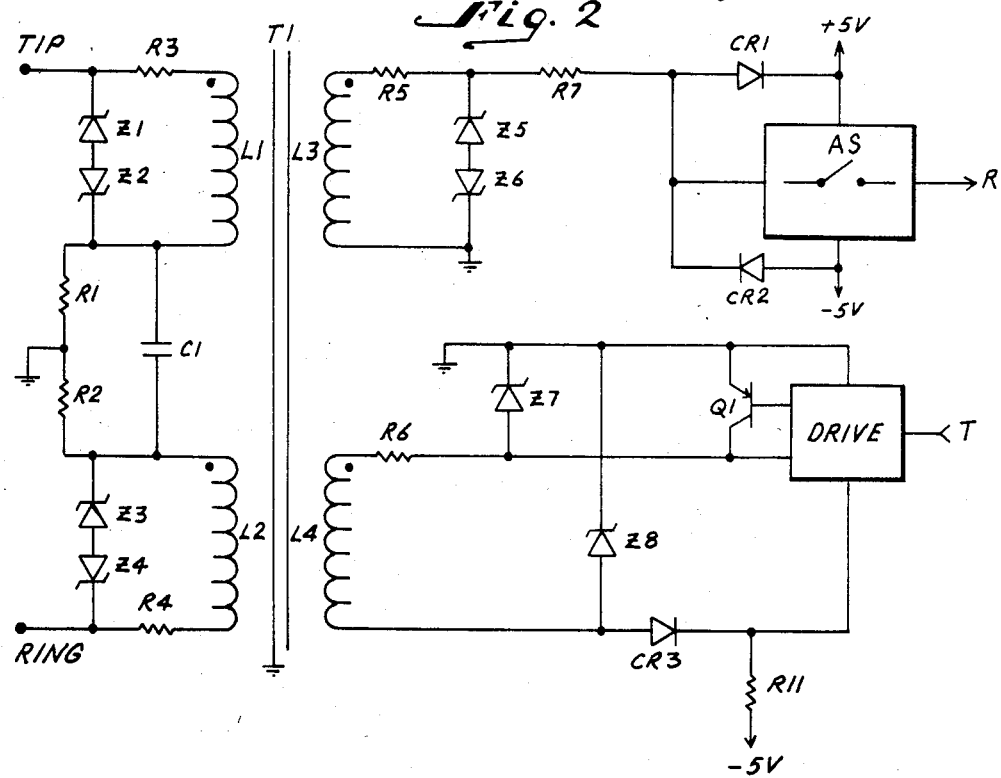
FIG. 2 is a schematic diagram of an embodiment of a circuit for providing lightning protection to a digital subscriber loop interface according to the present invention.

The lightning protection circuit for the digital subscriber loop interface shown in FIG. 2 is designed to protect against 1000 volt lightning pulses of the 5/1000 type, i.e., rise to 1000 volts in 5 microseconds and decay to 500 volts in 1000 microseconds, as specified by the Rural Electrification Agency. The signal can be either balanced, i.e., common mode, or differential. That is, the TIP and RING terminals of the DSL equipment can be either at the same potential or at different potentials. Most lightning signals will be a combination of both signal types, i.e., partially balanced and partially differential. Since the circuit can protect against both types of signals in the worst case, it can protect against them in each and every combination.

When the signal is common mode, then TIP and RING are at the same potential and may rise up to as much as 1000 volts from ground potential. Protection is provided by having split primary windings L1 and L2, of transformer T1, which are balanced. If L4 is selected with a 1.5/1.0 turns ratio, and L3 is selected with a 1.0/1.0 turns ratio, only a 1.5 volt difference would appear at the secondary winding L4 and a 1.0 volt difference at winding L3, with L1 and L2 balanced within 0.1 percent. Should the balance be poorer, then the increased differential voltage generated would be handled by the differential voltage protection capability of the circuit. With windings L1 and L2 balanced, the net impedance owing to L1 and L2 is, relative to limiting resistors R1 and R2, low and, therefore, relatively low voltage will appear across L1 and L2. Thus the voltage potential at points A and B, of L1 and L2, respectively, will be equal and at the lightning potential. Resistors R1 and R2 then limit the lightning current transient flowing to lightning ground. A 1000 volt lightning signal would thus cause, e.g., about 2.2 amperes to flow in each resistor and each winding, in the event that R1 and R2 were chosen to be 450 ohms each. Keeping R1 and R2 matched, to, e.g., 0.1 percent, minimizes the differential signal appearing on the secondaries. Other values of R1 and R2 can be used.

The worst case differential voltage situation occurs when the full 1000 volt lightning pulse appears between TIP and RING. In the completely differential mode, TIP would carry 500 volts and RING 500 volts of the opposite polarity. The differential voltage when applied would first appear across winding L1 and winding L2. Capacitor C1 would be uncharged so that points A and B would be at the same potential. The lightning voltage would divide across L1 and L2 approximately evenly for reasons of symmetry. When the voltage reaches the striking voltage of the back-to-back zener diode pairs Z1 and Z2 in the L1 circuit, and Z3 and Z4 in the L2 circuit, e.g., IN5234, the back biased zener diodes will begin to conduct at their knee voltage, e.g., nominally 6.2 volts. The other zener diodes in series will be forward biased and conduct with a low voltage drop, e.g., approximately 0.6 volts to 1.2 volts. The voltage limitations of the zener diodes limit the voltage across winding L1 and winding L2 to a voltage which is substantially lower than the lightning voltage, e.g., about 11 volts maximum. As a result, relatively large currents, diverted from L1 and L2, will flow through the zener diode pairs and capacitor C1 will begin to charge.

Since zener diodes are available that are rated to withstand 20 amperes for 5 microseconds, the value of capacitor C1 is selected so that it will charge up to 1000 volts in 5 microseconds, per the R.E.A. specifications, when 20 amperes flows through the zener diodes. Thus in 5 microseconds the current flow will substantially stop and the potential across C1 will be at 1000 volts. In this way the lightning voltage is absorbed by capacitor C1 and voltage across the transformer is limited. As the lightning voltage decays the capacitor will discharge through resistors R1 and R2, and the transformer primaries and/or the zener diodes but in the reverse direction. Thus the zener that was reverse biased during the rise time of the lightning pulse will now become forward biased and vice versa, so that the zeners will not be operated beyond their ratings. The decay time constant, e.g., with R1 and R2 equal to 450 ohms and C1 equal to 0.1 microfarads, is about 100 microseconds. This circuit results in most of the energy that the lightning delivers to the interface being absorbed by the capacitor C1, and not by the secondary windings of the transformer or by the resistors R1 and R2. The energy which the lightning can deliver to the transformer interface is limited by the capacitor C1. Also, the high lightning current flows into C1 rather than lightning ground.

The appearance of the 11 volts across each primary half, L1 and L2, in the worst case differential voltage situation, is equivalent to 22 volts on the full primary. Secondary current will flow first in secondary L4 because of its 1.5/1.0 turns ratio which causes the voltage of L4 to head toward 33 volts compared to the 22 volts of L3 due to its 1.0/1.0 turns ratio. With the transformer winding resistances R3, R4, R5, and R6 equal to 2.0 ohms, 2.0 ohms, 4.6 ohms, and 4.9 ohms, respectively, 2.5 amperes will flow in the primary as a result of secondary current flow. Approximately 1.5 amperes will flow in secondary L4 and 0.25 amperes in secondary L3. This assumes an 11 volt drop across back-to-back zener diode pairs Z5 and Z6 in the L3 circuit, and Z7 and Z8 in the L4 circuit. The diode pairs limit the voltage across L3 and L4. Actually, because of the lower current flowing in L3, the zener drop may be less than 11 volts in Z5 and Z6. The 11 volt zener drop will cause a 6 volt drop across current limiting resistor R7 when it is selected to be 100 ohms. Thus about 60 milliamperes could flow into the analog switch AS, e.g., CMOS 4066. However, diodes CR1 and CR2 shunt this current into either the $-5$ volt power supply or the $-5$ volt power supply, depending upon the polarity of the transient. This protects the analog switch and would not cause excessive current to flow into the power supplies.

In secondary L4, voltages are applied to the transmit secondary driving circuitry at the collector of transistor Q1, and the junction of R11 and the Q1 driving circuitry. When the dot end of L4 is positive, the collector of Q1 will go positive with respect to ground by one forward biased diode voltage drop, e.g., approximately 0.6 volts to 1.2 volts, because it is clamped to ground by forward biased Z7. Z8 has approximately 10 volts across it and would pull the end of R11 connected to the Q1 driving circuitry to approximately $-10$ volts. This would be approximately 5 volts across R11 and, if diode CR3 were not present, would cause a current flow of approximately 56 milliamperes out of the $-5$ volt supply, i.e., in a direction opposing the direction of the supplied current, in the event that R11 is selected to be 900 ohms. The presence of diode CR3 prevents this from happening by becoming reverse biased. However, since the 56 milliampere current flow may not disturb the voltage regulation of the $-5$ volt supply, diode CR3 may not be needed. Determination of the use of CR3 is dependent upon the ability of the $-5$ volt supply to absorb this current from the plurality of line circuits being supplied by the $-5$ volt supply.

If the dot end of L4 is negative then the collector of Q1 will go to approximately $-10$ volts because zener Z7 will be back biased. This voltage is withstandable by Q1. The junction of R11, CR3 and drive will go positive with respect to ground by one forward biased diode voltage drop which will put approximately 6 volts across R11. With R11 selected to be 900 ohms, approximately 67 milliamperes flow into the $-5$ volt supply, which should not disturb the voltage regulation of the supply.

Voltages induced in the secondaries by capacitance between the windings, primary and secondary, are not a problem because of the relatively low impedance of the circuits, and the fact that, effectively, one end of each secondary is grounded. Additionally the interwinding capacitances are small, in the order of 50 picofarads, and thus relatively high impedance.

It is apparent that the operating points and the component values used can be changed and adjusted to achieve various goals of lightning protection versus component cost, count, and type, power consumption, and manufacturing cost. It is therefore the intention in the appended claims to cover all such modifications as may fall within the true spirit and scope of the invention.

I claim:

1. A lightning protection circuit used in an interface of a digital subscriber loop having a transformer coupling communication signals from said loop to transmit and receive circuitry of said interface, comprising:
    means, coupled to said loop, for absorbing energy of lightning signals coupled from said loop to said interface;
    means, connected to said absorbing means, for discharging said energy, wherein said transformer has split primary windings, which are connected across said loop; and
    a pair of voltage limiting means, each connected across an associated one of said split primary windings, for limiting voltage across each of said windings.

2. A circuit as claimed in claim 1, wherein said split primary windings of said transformer are balanced.

3. A circuit as claimed in claim 1, further comprising:
    a pair of current limiting means, each of said pair connected between an associated one of said windings and ground, for limiting current flow from said loop to ground.

4. A circuit as claimed in claim 3, wherein said current limiting means compises a pair of matched resistors.

5. A circuit as claimed in claim 1, wherein each pair of said voltage limiting means comprises a pair of back-to-back zener diodes.

6. A circuit as claimed in claim 1, further comprising:
    means, connected to said transmit circuitry, for limiting voltage across a transmit secondary winding of said transformer.

7. A circuit as claimed in claim 6, wherein said voltage limiting means comprises a pair of back-to-back zener diodes.

8. A circuit as claimed in claim 1, further comprising:
    means, connected to said receive circuitry, for limiting voltage across a receive secondary winding of said transformer.

9. A circuit for protecting a digital subscriber loop interface from lightning signals, comprising:
    a transformer, having split primary windings, for coupling communication signals from said loop to transmit and receive circuitry;
    a pair of limiting means, each connected between ground and an associated one of said split primary windings, for limiting current transients flowing through each of said windings; and
    a pair of diverting means, each connected across an associated one of said windings, for diverting current transients from said loop away from said windings.

10. A lightning protection circuit used in an interface of a digital subscriber loop having a transformer coupling communication signals from said loop to transmit and receive circuitry of said interface, comprising:
    means, coupled to said loop, for absorbing energy of lightning signals coupled from said loop to said interface;
    means, connected to said absorbing means, for discharging said energy;
    means, connected to said transmit circuitry, for limiting voltage across a transmit secondary winding of said transformer; and
    means, connected between said transmit secondary winding and a power supply of said transmit circuitry, for blocking current transients, resulting from said lightning signals, from flowing through said power supply in a direction opposing current supplied from said supply.

11. A circuit as claimed in claim 10, wherein said voltage limiting means comprises a pair of back-to-back zener diodes.

12. A circuit as claimed in claim 10, further comprising:
    means, connected between said receive secondary winding and an analog switch of said receive circuitry, for limiting current flowing from said winding to said analog switch; and
    shunting means, connected between said current limiting means and a power supply of said analog switch, for shunting current transients resulting from said lightning signals away from said analog switch and into said power supply.

13. A circuit as claimed in claim 12, wherein said current limiting means comprises a resistor.

14. A circuit as claimed in claim 12, wherein said shunting means comprises a diode.

* * * * *